(No Model.)
E. THOMSON.
LIGHTNING ARRESTER.
No. 495,714. Patented Apr. 18, 1893.
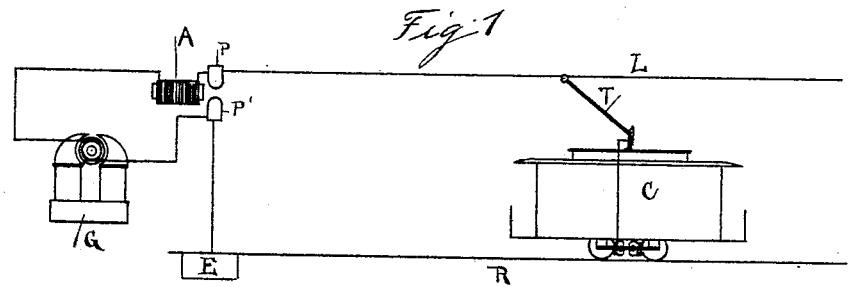
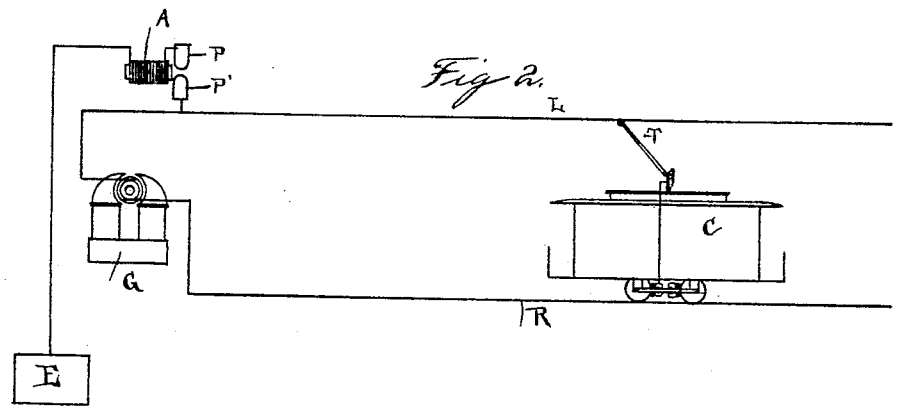
Witnesses:
Inventor:
Elihu Thomson
By
H. C. Townsend
Attorney.
THE NORRIS PETERS CO., PHOTO-LITHO., WASHINGTON, D. C.

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

LIGHTNING-ARRESTER.

SPECIFICATION forming part of Letters Patent No. 495,714, dated April 18, 1893.

Application filed August 5, 1889. Serial No. 319,832. (No model.)

*To all whom it may concern:*

Be it known that I, ELIHU THOMSON, a citizen of the United States, and a resident of Lynn, in the county of Essex and State of Massachusetts, have invented certain new and useful Improvements in Lightning-Arresters, of which the following is a specification.

My invention relates to the manner of applying or connecting lightning arresters used with electric lines or mains employed for the transmission of power for electric lighting or for other purposes.

The object of my invention is to secure a more effectual protection of the apparatus on such lines from lightning by so organizing or connecting the lines, the apparatus and the lightning arrester as to afford by the lightning arrester a more ready path for the lightning stroke than is the case in present arrangements.

When lightning arresters are applied to lines or circuits in which the apparatus connected to such circuit is in a ground wire or connection from the same it is the practice to run a separate ground wire or connection from the ground plate of the lightning arrester, and it very frequently happens that the self induction of the latter ground wire or circuit is larger than that of the ground wire or connection containing the apparatus to be protected, or is so large as compared with the same that the apparatus is not thoroughly protected, the lightning stroke being shunted off through such apparatus instead of passing through the lightning arrester and over the ground circuit for the latter.

The object of the first part of my invention is to make this condition of affairs impossible and to produce an organization wherein the self induction or resistance from the ground plate of the lightning arrester can never be greater than that of the ground connection or circuit leading from the apparatus to be protected.

My invention is especially applicable to dynamo electric machines supplying electric lines or circuits with electricity for light, power or other purposes.

The invention consists essentially in forming the ground connection for the dynamo or other apparatus by way of the ground wire for the lightning arrester so that the self induction or resistance from the ground plate of the lightning arrester can never be greater than the circuit for the line through the apparatus to be protected and to ground. Or, in other words, I locate the lightning arrester in a shunt around the dynamo or other apparatus from the line or main to the connection leading from the dynamo or other apparatus to ground.

My invention further consists in certain improvements in the manner of organizing and connecting the parts of a lightning arrester which is provided with an arc rupturing magnet having the functions of the magnet forming the subject of my prior patent No. 321,464, dated July 7, 1885.

My invention consists essentially in locating the arc rupturing magnet in position where its self-induction will not oppose the passage of the lightning stroke by way of the lightning arrester to ground, and further consists in locating it in the ground wire or connection leading through the apparatus to be protected, at a point beyond the point of application of the lightning arrester to the line wire and the ground so that by its self induction it shall positively oppose the passage of the lightning stroke to the dynamo or other apparatus and shall act to force the lightning stroke to pass by way of the arrester to ground.

My invention consists also, broadly, in locating the arc rupturing magnet on a circuit of any description between the dynamo machine and the point of connection of the grounded lightning arrester.

In the accompanying drawings:—Figure 1, is a diagram illustrating an arrangement of circuits and apparatus embodying my invention. Fig. 2, is a diagram illustrating the arrangement employed previous to my invention.

I have shown in the drawings the application of the invention to an electric line and dynamo forming a part of an electric railway, but the manner of applying the invention to circuits and apparatus used for other purposes will be obvious from the description given of the special application shown.

In Fig. 1, G, is a generator of electricity which generator may have any form or character such as an arc light dynamo, an incandescent or alternating current dynamo, or may be a motor used upon any of these circuits or other electrical apparatus.

C, is the work which is represented in the drawings as an electric car whose motor is connected by a trolley T, into a circuit between the main wire L, and the track and ground after the manner commonly employed.

P, P', are the plates or electrodes of a lightning arrester of any desired character placed in the ground circuit or connection from the line L, after the usual manner.

A, indicates the arc rupturing magnet employed for dispersing or rupturing any arc which may follow or tend to be maintained across the space between the electrodes after the passage of the lightning stroke or other abnormal flow of high tension current. The dynamo G, in this system has one pole connected to ground and the other to line. The ground wire or circuit for said dynamo is by a wire or connection taken to the arrester electrode P', or to a point near the same so that the dynamo circuit is by way of the ground wire or connection of the lightning arrester. The magnet A, is placed in the connection from the line to ground by way of the dynamo and at a point between the point of application of the arrester and the dynamo or other apparatus to be protected and will therefore obviously oppose, by its self induction, the passage of the lightning through the ground circuit in which it is placed and by so doing will force or tend to shunt the lightning stroke to ground by way of the arrester. It will also be observed that the ground circuit from the dynamo to earth is necessarily of greater length and self induction than the ground circuit from the lightning arrester so that in this respect also the lightning arrester invites or tends to take the lightning discharge in preference to the path which passes thereby through the dynamo or other apparatus.

The operation of the apparatus is as follows:—Should a lightning discharge induce a powerful current in the line L, or find a path for itself upon the line L, it would have several outlets to earth. It could go by the trolley arm T, to the car and thence to the track R, and also leap the space separating the plates P, P', to earth E. There is also a path through the magnet A, and the generator G, back to the plate P', and thence to earth E, but the static charge will not follow this path on account of the self induction of A, added to that of G, and the freer path of smaller or no self induction existing across the slight space between the electrodes P, P', and to earth E. The spark however establishes a path for the current of the generator G, between the plates P, P', and short circuits the machine, but the arc being under the influence of the magnet field of the magnet A, is instantly blown out and destroyed, leaving the line in its normal working condition and the protective devices set for any other discharges which may occur. It will thus be seen that the generator G, is electrically isolated from the path of the lightning discharge, which is of a different character from the current which it generates, and is thus preserved from harm. Should motors be employed upon the line L, which might also be damaged by the lightning discharge short circuiting them or jumping through their insulation I provide similar protective arrangements, the lightning in all cases finding a path of lower resistance to its flow by leaping across plates P, P', placed in a circuit to earth the space between which is subjected to the action of a magnetic field or other arc rupturing devices such as I have described in my prior patent No. 321,464. It is of course to be understood that the generator G, is well insulated from the earth except through the line leading to the plate P'. Because of the high self induction of the circuit through A, and G, very little if any of the lightning discharge upon the line L, can pass therethrough, the resistance of this path for the discharge being very great as compared with that from the line L, across the space between the plates P, P', to E. In the prior arrangement illustrated in Fig. 2, however, it will be noticed that the ground circuit or connection from the line L, through the dynamo G, and to R, is independent of that through the lightning arrester contacts or electrodes and to earth, and that moreover the arc rupturing magnet is in the latter path or branch so that its self induction is added to the natural self induction of that circuit. It will be noticed further that the ground connection from the dynamo G, itself being independent of that by way of the ground electrode P', is not as in the previous instance necessarily of lower self induction than the arrester ground circuit. Therefore, in this instance, the lightning discharge will find an easier path through the generator than in the previous case because the conditions are not so good for the provoking of the shunt or independent ground path or circuit for the lightning.

While I have shown the magnet A, in Fig. 1, as included in the main line circuit or in a ground connection therefor independent of the lightning arrester so that it is constantly energized, I do not limit myself to such arrangement since the gist of my invention consists in removing the arrester magnet from the position which it occupies in Fig. 2, in the circuit around the dynamo and placing it in some independent circuit. I prefer however to place it in the main line circuit since it may then be energized by the current flowing over such circuit and is constantly energized while in the position shown in Fig. 2, it would only be energized simultaneously with the flow of current across the space between the lightning arrester electrodes and to earth.

What I claim as my invention is—

1. The combination with an electric line, and a dynamo machine connected to such line and to ground, of a lightning arrester consisting of two electrodes normally insulated from one another by a narrow insulating space, and placed in a shunt around the dynamo from the line to the wire or connection leading from the dynamo to ground.

2. The combination with a line wire and apparatus such as electric motors fed from such line to and through a ground return circuit, of a lightning arrester one of whose separated plates or electrodes is attached to the line and the other of whose plates or electrodes is attached to a ground connection or ground wire to which ground wire is also attached the terminal of the dynamo which is normally to be kept grounded while the other terminal is connected to the line, and arc rupturing devices for preventing the formation and continuance of an arc between the separated plates of the lightning arrester.

3. The combination with a line wire and apparatus connected to such line and fed with current passing over the line and to a ground return, of a lightning arrester one of whose normally separated plates or electrodes is attached to the line while the other is attached to a ground connection or ground wire which leads to the wire connected to the ground terminal of the dynamo, and an arc rupturing magnet in the line connection between the point of attachment of the lightning arrester and said dynamo, as and for the purpose described.

4. The combination with a dynamo machine feeding current into an insulated line at one terminal and connected with the ground for its return by the other terminal, of a set of lightning arrester plates or dischargers connected respectively to the insulated line wire by a short connection and to the ground connected wire or terminal by a short connection or connection of no self-induction, and in combination with such lightning arrester plates suitable arc rupturing devices for extinguishing or interrupting an arc which may form between the arrester plates or dischargers.

5. The combination with a dynamo or dynamos supplying currents to an insulated line wire, of a lightning arrester consisting of opposed plates or electrodes normally insulated from one another, one of which plates connects to the line wire, and a ground connection common to the other plate of the arrester and the terminal of the dynamo not connected to the insulated line wire, whereby the self-induction of the line wire in resisting the passage to earth of the lightning discharge is made ineffective as an element in causing such discharge to pass through the dynamo.

6. The combination with an electric line, a dynamo machine or motor connected to such line and grounded at its other terminal, of a lightning arrester placed in a shunt around the dynamo from the line to the wire or connection leading from the dynamo to the ground, said lightning arrester being provided with means for preventing the continuance of a discharge to ground from line after the passage of the static discharge due to lightning.

7. The combination with a line wire and apparatus, such as dynamos or electric motors, connected to or from such line through a ground return circuit, of a lightning arrester, one of whose plates or electrodes is attached, to the line and the other of whose plates or electrodes is attached to a ground connection or ground wire to which ground wire is also attached the terminal of the dynamo which is normally to be kept grounded while the other terminal is connected to line, said lightning arrester being constructed to allow the free passage of static discharges to ground from the line and to prevent any considerable escape of the dynamo current from line to ground.

8. The combination of a dynamo machine, a ground connection for one of its terminals, an insulated line leading from the other terminal to a lightning arrester one electrode of which is attached to the line and the other directly to the same ground terminal forming the other pole of the dynamo in such manner that the lightning arrester forms a shunt of short length, or shunt of practically no self-induction around the dynamo or motor from line to ground.

Signed at Lynn, in the county of Essex and State of Massachusetts, this 1st day of August, A. D. 1889.

ELIHU THOMSON.

Witnesses:
JOHN W. GIBBONEY,
A. L. ROHRER.